United States Patent
Wang et al.

(10) Patent No.: US 12,492,447 B2
(45) Date of Patent: Dec. 9, 2025

(54) NONLINEAR OXYGEN-ENRICHED INJECTION METHOD BASED ON CHAOTIC MAPPING AND ELECTRONIC DEVICE THEREOF

(71) Applicant: Kunming University of Science and Technology, Kunming (CN)

(72) Inventors: Hua Wang, Kunming (CN); Kai Yang, Kunming (CN); Qingtai Xiao, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 551 days.

(21) Appl. No.: 18/164,476

(22) Filed: Feb. 3, 2023

(65) Prior Publication Data
US 2024/0102129 A1  Mar. 28, 2024

(30) Foreign Application Priority Data
Sep. 28, 2022  (CN) .......................... 202211188989.4

(51) Int. Cl.
  *C22B 9/05*  (2006.01)
(52) U.S. Cl.
  CPC ..................... *C22B 9/05* (2013.01)
(58) Field of Classification Search
  CPC ....................................................... C22B 9/05
  See application file for complete search history.

(56) References Cited

FOREIGN PATENT DOCUMENTS

CN  113340118 A * 9/2021 ............ F27B 14/143

OTHER PUBLICATIONS

CN-113340118-A English (Year: 2021).*

* cited by examiner

*Primary Examiner* — Ricardo D Morales
(74) *Attorney, Agent, or Firm* — Maschoff Brennan

(57) ABSTRACT

A nonlinear oxygen-enriched injection method based on chaotic mapping and electronic device is disclosed, including: obtaining a chaotic gas injection volume corresponding to a current speed change period according to a chaotic mapping value corresponding to the current speed change period and a peak gas injection volume in an oxygen-enriched injection process; determining a rotational speed of a fan blade in a fan component corresponding to the current speed change period according to the chaotic gas injection volume; updating a rotational speed of a direct current (DC) motor in the fan component corresponding to the current speed change period according to the rotational speed of the fan blade in the fan component, and driving the fan blade to rotate according to an updated rotational speed of the DC motor, so as to update an air output of the fan component. The above operations are repeated until a last stage.

16 Claims, 3 Drawing Sheets

NONLINEAR OXYGEN-ENRICHED INJECTION METHOD BASED ON CHAOTIC MAPPING AND ELECTRONIC DEVICE THEREOF

CROSS REFERENCE TO RELATED APPLICATION

This patent application claims the benefit and priority of Chinese Patent Application No. 202211188989.4 filed with the China National Intellectual Property Administration on Sep. 28, 2022, the disclosure of which is incorporated by reference herein in its entirety as part of the present application.

TECHNICAL FIELD

The present disclosure relates to the field of non-ferrous metal smelting, and in particular, to a nonlinear oxygen-enriched injection method based on chaotic mapping and an electronic device thereof.

BACKGROUND

Oxygen-enriched injection refers to injection of industrial oxygen into a molten pool, even if oxygen content of a gas sprayed from a spray gun exceeds that of the atmosphere. Oxygen-enriched injection is an important process for non-ferrous metal smelting. The use of oxygen enrichment promotes the autothermal reaction in the molten pool, which greatly improves smelting efficiency. The injection has a stirring effect on the molten pool, which promotes more uniform distribution of working medium and temperature in the molten pool.

In the pyrometallurgical process, when a mixed state in the molten pool reaches chaos, the reaction effect is optimal, and the non-linear injection method is an excellent means to induce chaos in the molten pool. At present, most scholars around the world study the oxygen-enriched injection process by changing the air input, the insertion depth of the spray gun and the structure of the spray gun to strengthen the oxygen-enriched injection effect. However, non-linear oxygen-enriched injection methods are difficult to achieve and are less studied due to the involvement of motor control, parameter selection, etc.

SUMMARY

To solve the above technical problems, the present disclosure provides a nonlinear oxygen-enriched injection method based on chaotic mapping and an electronic device.

To achieve the above objective, the present disclosure provides the following technical solutions.

In a first aspect, the present disclosure provides a nonlinear oxygen-enriched injection method based on chaotic mapping, including:

obtaining a chaotic mapping value corresponding to a current speed change period;

obtaining a chaotic gas injection volume corresponding to the current speed change period according to the chaotic mapping value corresponding to the current speed change period and a peak gas injection volume in an oxygen-enriched injection process, where speed change periods are determined by dividing the oxygen-enriched injection process at equal time intervals;

determining a rotational speed of a fan blade in a fan component corresponding to the current speed change period according to the chaotic gas injection volume corresponding to the current speed change period and a first relation, where the first relation is a relation between the chaotic gas injection volume and the rotational speed of the fan blade;

updating a rotational speed of a direct current (DC) motor in the fan component corresponding to the current speed change period according to the rotational speed of the fan blade in the fan component corresponding to the current speed change period, and driving the fan blade to rotate according to an updated rotational speed of the DC motor, so as to update an air output of the fan component; and determining whether the current speed change period is a last speed change period, and if not, calculating a chaotic mapping value corresponding to a next speed change period, updating the chaotic mapping value corresponding to the current speed change period to be the chaotic mapping value corresponding to the next speed change period, updating the current speed change period to be the next speed change period, and returning to the step of obtaining a chaotic gas injection volume corresponding to the current speed change period according to the chaotic mapping value corresponding to the current speed change period and a peak gas injection volume in an oxygen-enriched injection process.

Optionally, the obtaining a chaotic mapping value corresponding to a current speed change period specifically includes:

according to chaotic mapping of Logistic-Logistic (L-L) cascade and a chaotic mapping value corresponding to a previous speed change period, calculating the chaotic mapping value corresponding to the current speed change period.

Optionally, the obtaining a chaotic gas injection volume corresponding to the current speed change period according to the chaotic mapping value corresponding to the current speed change period and a peak gas injection volume in an oxygen-enriched injection process specifically includes:

calculating the chaotic gas injection volume corresponding to the current speed change period according to $Q_i = Q_f x_i$, where $Q_i$ is the chaotic gas injection volume corresponding to the current speed change period, i is the current speed change period, $x_i$ is the chaotic mapping value corresponding to the current speed change period, and $Q_f$ is the peak gas injection volume in the oxygen-enriched injection process.

Optionally, the determining a rotational speed of a fan blade in a fan component corresponding to the current speed change period according to the chaotic gas injection volume corresponding to the current speed change period and a first relation specifically includes:

calculating the rotational speed of the fan blade in the fan component corresponding to the current speed change period according to $n_i = \alpha Q_i$, where $n_i$ is the rotational speed of the fan blade in the fan component corresponding to the current speed change period, i is the current speed change period, $Q_i$ is the chaotic gas injection volume corresponding to the current speed change period, and $\alpha$ is determined by the air output of the fan component and the rotational speed of the fan blade in the fan component.

Optionally, the updating a rotational speed of a DC motor in the fan component corresponding to the current speed change period according to the rotational speed of the fan blade in the fan component corresponding to the current speed change period specifically includes:

calculating a duty cycle of a power signal of the DC motor corresponding to the current speed change period according to the rotational speed of the fan blade in the fan component corresponding to the current speed change period;

calculating an average terminal voltage of an armature of the DC motor corresponding to the current speed change period according to the duty cycle of the power signal of the DC motor corresponding to the current speed change period; and updating the rotational speed of the DC motor in the fan component corresponding to the current speed change period according to the average terminal voltage of the armature of the DC motor corresponding to the current speed change period.

Optionally, the rotational speed of the DC motor in the fan component corresponding to the current speed change period is a theoretical rotational speed of the DC motor, and the method further includes:

obtaining an actual rotational speed of the DC motor in the current speed change period; and causing the actual rotational speed of the DC motor to be identical with the theoretical rotational speed of the DC motor by using a proportional-integral-derivative (PID) control algorithm.

Optionally, the calculating a duty cycle of a power signal of the DC motor corresponding to the current speed change period according to the rotational speed of the fan blade in the fan component corresponding to the current speed change period specifically includes:

calculating the duty cycle of the power signal of the DC motor corresponding to the current speed change period according to $\gamma_i = \beta n_i + c$, where $n_i$ is the rotational speed of the fan blade in the fan component corresponding to the current speed change period, i is the current speed change period, $\gamma_i$ is the duty cycle of the power signal of the DC motor corresponding to the current speed change period, $\beta$ is a coefficient, and c is a constant.

In a second aspect, the present disclosure provides a nonlinear oxygen-enriched injection method based on chaotic mapping, including:

determining a chaotic mapping value corresponding to each speed change period, where speed change periods are determined by dividing an oxygen-enriched injection process at equal time intervals, and the speed change periods are arranged in a chronological order;

obtaining a chaotic gas injection volume corresponding to each speed change period according to the chaotic mapping value and a peak gas injection volume in the oxygen-enriched injection process;

determining a rotational speed of a fan blade in a fan component corresponding to each speed change period according to the chaotic gas injection volume corresponding to each speed change period and a first relation, where the first relation is a relation between the chaotic gas injection volume and the rotational speed of the fan blade; and updating a rotational speed of a DC motor in the fan component corresponding to each speed change period according to the rotational speed of the fan blade in the fan component corresponding to each speed change period, and according to the arrangement order of the speed change periods, driving the fan blade to rotate according to an updated rotational speed of the DC motor, so as to update an air output of the fan component.

In a third aspect, the present disclosure provides an electronic device, including a memory and a processor. The memory is configured to store a computer program, and the processor runs the computer program to enable the electronic device to implement the nonlinear oxygen-enriched injection method based on chaotic mapping according to the first aspect.

In a fourth aspect, the present disclosure provides an electronic device, including a memory and a processor. The memory is configured to store a computer program, and the processor runs the computer program to enable the electronic device to implement the nonlinear oxygen-enriched injection method based on chaotic mapping according to the second aspect.

According to specific embodiments provided by the present disclosure, the present disclosure discloses the following technical effects:

(1) The nonlinear oxygen-enriched injection method based on chaotic mapping and the electronic device provided by the present disclosure can induce chaos in a molten pool by nonlinear updating of the air output of the fan component, which promotes a reaction process, and greatly improves smelting efficiency.

(2) The nonlinear oxygen-enriched injection method based on chaotic mapping and the electronic device provided by the present disclosure can be used in a pyrometallurgical process, especially in the non-ferrous metal molten pool smelting process.

(3) The nonlinear oxygen-enriched injection method based on chaotic mapping and the electronic device provided by the present disclosure can change a type of injection gas and be applied to working medium mixing fields such as chemical industry.

BRIEF DESCRIPTION OF THE DRAWINGS

To describe the embodiments of the present disclosure or the technical solutions in the prior art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

Figure 1:
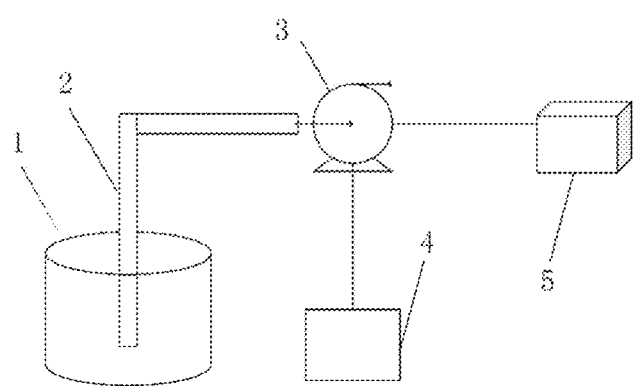
FIG. 1 is a schematic structural diagram of a nonlinear oxygen-enriched injection system based on chaotic mapping disclosed in Embodiment I of the present disclosure.

Reference numerals: 1—molten pool, 2—spray gun component, 3—fan component, 4—control module, and 5—power supply.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

To make the above-mentioned objective, features, and advantages of the present disclosure clearer and more comprehensible, the present disclosure will be further described in detail below in conjunction with the accompanying drawings and specific embodiments.

Embodiment I

As shown in FIG. 1, the embodiment of the present disclosure provides a nonlinear oxygen-enriched injection system based on chaotic mapping, including: a molten pool 1, a spray gun component 2, a fan component 3, a control module 4, and a power supply 5. A spray gun of the spray gun component 2 goes deep into the molten pool 1, and is fixed from the top with a bracket according to the actual demand. The molten pool 1 is cylindrical, with a bottom and no top. The other end of the spray gun component 2 is connected with the fan component 3 through a tube, and supplied with air by the fan component 3; and the fan component 3 is connected with the power supply 5, and controlled by the control module 4.

The molten pool 1 is provided with liquid and a liquid-solid mixture, and the fan component 3 rotates to provide air, which is sprayed into the molten pool 1 by the spray gun of the spray gun component 2. The molten pool 1 is used for mixing multiphases such as gas-liquid phases or gas-liquid-solid phases.

Further, in an optimized solution, the molten pool 1 includes but is not limited to top blowing molten pool, side blowing molten pool and bottom blowing molten pool. The molten pool 1 can be replaced by a pyrometallurgical molten pool smelting furnace body, a hydrometallurgical steam heating molten pool, a chemical reaction tank, etc.

Embodiment II

Figure 2:
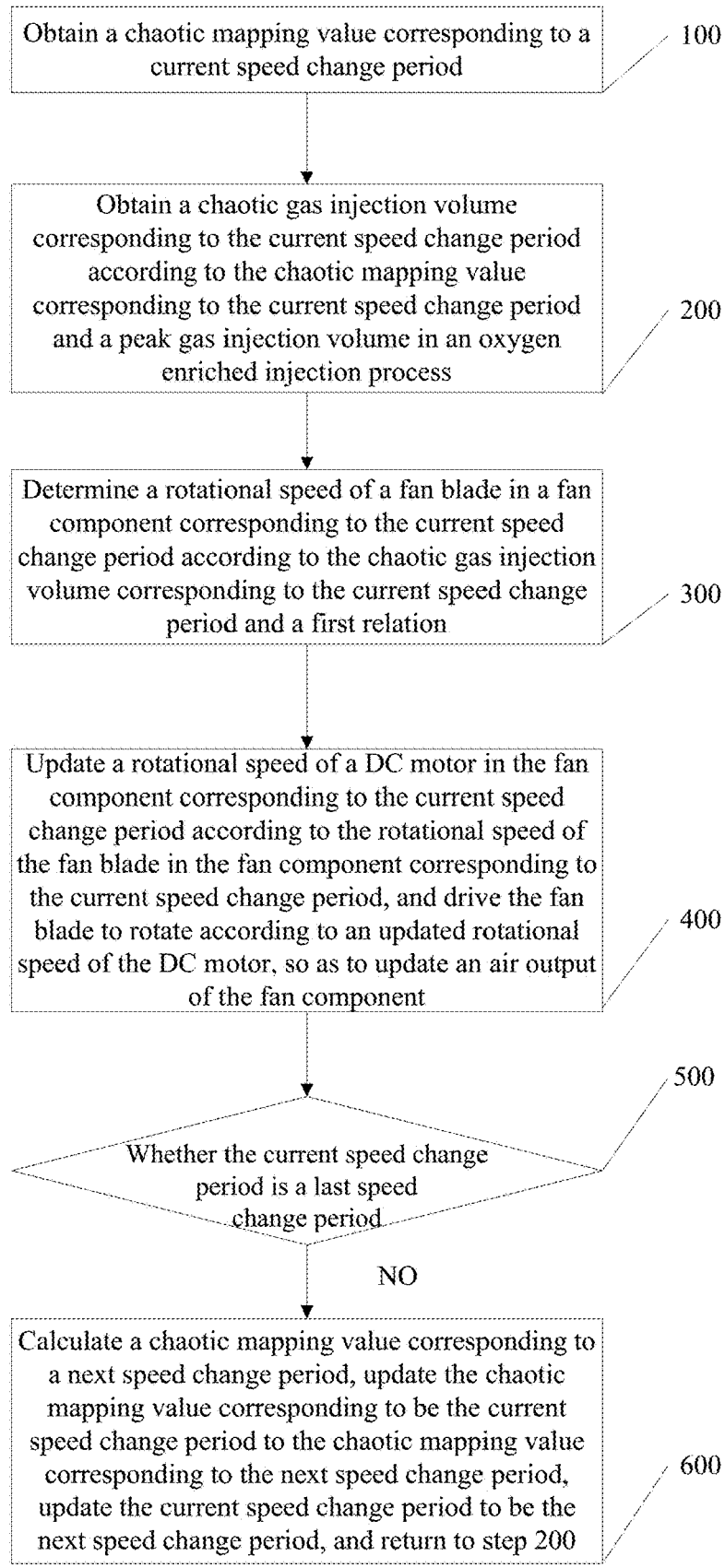
FIG. 2 is a flow diagram of a nonlinear oxygen-enriched injection method based on chaotic mapping disclosed in Embodiment II of the present disclosure.

As shown in FIG. 2, the embodiment of the present disclosure provides a nonlinear oxygen-enriched injection method based on chaotic mapping applied to Embodiment I, including the following steps 100 to 600.

In step 100, a chaotic mapping value corresponding to a current speed change period is obtained.

In step 200, a chaotic gas injection volume corresponding to the current speed change period is obtained according to the chaotic mapping value corresponding to the current speed change period and a peak gas injection volume in an oxygen-enriched injection process. Speed change periods are determined by dividing the oxygen-enriched injection process at equal time intervals.

In step 300, a rotational speed of a fan blade in a fan component corresponding to the current speed change period is determined according to the chaotic gas injection volume corresponding to the current speed change period and a first relation. The first relation is a relation between the chaotic gas injection volume and the rotational speed of the fan blade.

In step 400, a rotational speed of a DC motor in the fan component corresponding to the current speed change period is updated according to the rotational speed of the fan blade in the fan component corresponding to the current speed change period, and the fan blade is driven to rotate according to an updated rotational speed of the DC motor, so as to update an air output of the fan component.

In step 500, whether the current speed change period is a last speed change period is determined. If not, step 600 is performed. If yes, the method ends directly.

In step 600, a chaotic mapping value corresponding to a next speed change period is calculated, the chaotic mapping value corresponding to the current speed change period is updated to be the chaotic mapping value corresponding to the next speed change period, the current speed change period is updated to be the next speed change period, and the method returns to step 200.

As a preferred implementation, step 100 in the embodiment of the present disclosure specifically includes the following sub-step.

According to chaotic mapping of L-L cascade and a chaotic mapping value corresponding to a previous speed change period, the chaotic mapping value corresponding to the current speed change period is calculated.

As a preferred implementation, step 200 in the embodiment of the present disclosure specifically includes the following sub-step.

The chaotic gas injection volume corresponding to the current speed change period is calculated according to $Q_i = Q_f \cdot x_i$,
  where $Q_i$ is the chaotic gas injection volume corresponding to the current speed change period, i is the current speed change period, $x_i$ is the chaotic mapping value corresponding to the current speed change period, and $Q_f$ is the peak gas injection volume in the oxygen-enriched injection process.

As a preferred implementation, step 300 in the embodiment of the present disclosure specifically includes the following sub-step.

The rotational speed of the fan blade in the fan component corresponding to the current speed change period is calculated according to $n_i = \alpha Q_i$,
  where $n_i$ is the rotational speed of the fan blade in the fan component corresponding to the current speed change period, i is the current speed change period, $Q_i$ is the chaotic gas injection volume corresponding to the current speed change period, and $\alpha$ is determined by the air output of the fan component and the rotational speed of the fan blade in the fan component.

As a preferred implementation, updating a rotational speed of a DC motor in the fan component corresponding to the current speed change period according to the rotational speed of the fan blade in the fan component corresponding to the current speed change period in step 400 in the embodiment of the present disclosure specifically includes the following sub-steps.

A duty cycle of a power signal of the DC motor corresponding to the current speed change period is calculated according to the rotational speed of the fan blade in the fan component corresponding to the current speed change period. Specifically, the duty cycle of the power signal of the DC motor corresponding to the current speed change period is calculated according to $\gamma_i = \beta n_i + c$, where $n_i$ is the rotational speed of the fan blade in the fan component corresponding to the current speed change period, i is the current speed change period, $\gamma_i$ is the duty cycle of the power signal of the DC motor corresponding to the current speed change period, $\beta$ is a coefficient, and c is a constant.

An average terminal voltage of an armature of the DC motor corresponding to the current speed change period is calculated according to the duty cycle of the power signal of the DC motor corresponding to the current speed change period.

The rotational speed of the DC motor in the fan component corresponding to the current speed change period is updated according to the average terminal voltage of the armature of the DC motor corresponding to the current speed change period.

Further, the rotational speed of the DC motor in the fan component corresponding to the current speed change period is a theoretical rotational speed of the DC motor, and the method further includes the following steps.

An actual rotational speed of the DC motor is obtained in the current speed change period. The actual rotational speed of the DC motor is caused to be identical with the theoretical rotational speed of the DC motor by using a PID control algorithm.

Embodiment III

Figure 3:
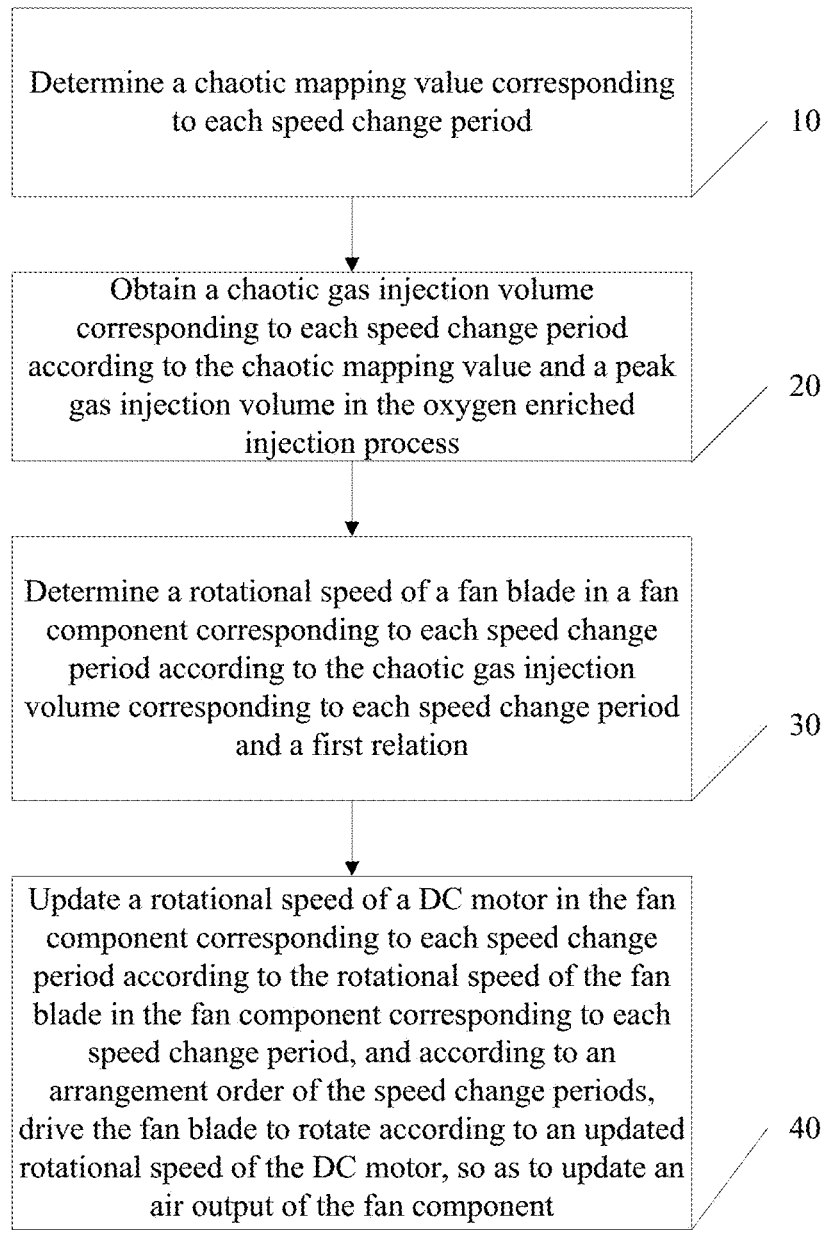
FIG. 3 is a flow diagram of a nonlinear oxygen-enriched injection method based on chaotic mapping disclosed in Embodiment III of the present disclosure.

In view of the problems in the prior art, the embodiment of the present disclosure provides a nonlinear oxygen-enriched injection method based on chaotic mapping applied to Embodiment I, as shown in FIG. 3, including the following steps 10-40.

In step 10, a chaotic mapping value corresponding to each speed change period is determined. Speed change periods are determined by dividing an oxygen-enriched injection process at equal time intervals, and the speed change periods are arranged in a chronological order.

In step 20, a chaotic gas injection volume corresponding to each speed change period is obtained according to the chaotic mapping value and a peak gas injection volume in the oxygen-enriched injection process One example is as follows.

A peak gas injection volume $Q_f$ in the oxygen-enriched injection process is obtained or the peak gas injection volume $Q_f$ in the oxygen-enriched injection process is given. The peak gas injection volume $Q_f$ is multiplied by a chaotic sequence value $x_i$ of L-L cascade mapping to obtain a chaotic gas injection volume $Q_i$, namely $Q_i = Q_f x_i$, where $x_i$ comes from the L-L cascade mapping, while one-dimensional Logistic mapping is $x_i = \mu x_{i-1}(1 - x_{i-1})$.

In the present embodiment, the chaotic sequence value $x_i$ obtained by the L-L cascade mapping can be replaced according to the actual demand, and can also be calculated by other chaotic mapping.

L-L cascade chaotic rotational speed is generated on the basis of a Logistic mapping chaotic system. Logistic mapping is selected as the basic theory of chaos generating chaos speed, which is defined as:

$$y_{n+1} = \mu_1 y_n (1 - y_n),$$

where when the parameter is $\mu_1 \in (3.75, 4)$, the mapping is in a chaotic state.

The present disclosure uses two Logistics for cascade, forming a numerical form of a two-dimensional chaotic mapping sequence, namely L-L cascade mapping, and the obtained chaotic sequence value $x_i$ covers a wider range than that obtained by logistics cascade mapping. L-L cascade mapping is defined as:

$$x_{i+1} = \mu_2 x_i (1 - x_i),$$

where when the parameter is $\mu_2 \in (3.75, 4)$, the mapping is in a chaotic state.

The peak gas injection volume $Q_f$ in the oxygen-enriched injection process is determined by the engineering practice.

Taking the oxygen-enriched top blowing process in the pyrometallurgical field as an example, the peak gas injection volume $Q_f$ in the oxygen-enriched injection process represents a maximum gas injection volume in the process. The chaotic sequence value $x_i$ of L-L cascade mapping is calculated by numerical simulation software.

In step 30, a rotational speed of a fan blade in a fan component corresponding to each speed change period is determined according to the chaotic gas injection volume corresponding to each speed change period and a first relation. The first relation is a relation between the chaotic gas injection volume and the rotational speed of the fan blade.

A relation between the chaotic gas injection volume $Q_i$ and the rotational speed $n_i$ of the fan blade, namely a first relation $n_i = \alpha Q_i$, is obtained using the relation between the air output of the fan component and the rotational speed of the fan blade.

The rotational speed $n_i$ of the fan blade is assigned to the control module 4 in sequence every speed change period T, and then the control module 4 adjusts the rotational speed of the DC motor in the fan component according to the rotational speed $n_i$ of the fan blade.

In order to protect the DC motor, the speed change period T cannot be too short in engineering practice to avoid burning the DC motor.

The relations between the chaotic gas injection volume $Q_i$ and the rotational speed $n_i$ of the fan blade are different for different fan components, so this step and the formula $n_i = \alpha Q_i$ should be adapted to local conditions.

In step 40, a rotational speed of a DC motor in the fan component corresponding to each speed change period is updated according to the rotational speed of the fan blade in the fan component corresponding to each speed change period, and according to the arrangement order of the speed change periods, the fan blade is driven to rotate according to an updated rotational speed of the DC motor, so as to update an air output of the fan component.

One example is as follows.

According to the DC motor model and the power supply voltage U during the experiment, the rotational speed $n_i$ of the fan blade is converted into a corresponding pulse width modulation (PWM) duty cycle γ through a certain relational expression, that is, $\gamma = \beta n_i + c$.

DC PWM is used to switch on and off the power supply at a fixed frequency, and the switching-on and switching-off times in a cycle are changed as required, that is, an average terminal voltage of an armature of the motor is changed by changing the duty cycle γ to adjust the rotational speed of the DC motor. The average terminal voltage of the armature is:

$$U_{aV} = (2\gamma - 1)U_s,$$

where $U_{aV}$ is the average terminal voltage of the armature of the fan motor, γ is the duty cycle, and $U_s$ is an input power supply voltage.

The theoretical rotational speed of motor output is:

$$n_i = \lambda(2\gamma - 1)U_s,$$

where λ is a coefficient. The present embodiment adopts a speed feedback system. The core of the speed feedback system is a rotational speed PID regulator, and the duty cycle γ is transmitted to the motor through the upper computer interface in the control module 4 and the single-chip microcontroller control system, such that the fan blade rotates at the input chaotic speed $n_i$.

The oxygen content in the injected gas is greater than the oxygen content in the air. The type and oxygen enrichment amount of the injected gas can be set according to the actual demand. The injection time of each type of injected gas can be set according to the actual demand. The peak value of the gas injection volume can be set according to the actual demand.

Further, the nonlinear oxygen-enriched injection method based on chaotic mapping provided by the present disclosure is integrated in the control module, and can be applied to the field of oxygen-enriched injection and stirring in pyrometallurgy, such as top-blowing oxygen-enriched molten pool melting, side-blown furnace molten pool melting, and bottom-blowing converter molten pool melting. In addition, the chaotic injection method can also be applied to the flame spray gun in the pyrometallurgical heating furnace, the steam injection heating process in hydrometallurgy, and the stirring process in chemical industry.

Embodiment IV

The embodiment of the present disclosure provides an electronic device, including a memory and a processor. The memory is configured to store a computer program, and the processor runs the computer program to enable the electronic device to implement the nonlinear oxygen-enriched injection method based on chaotic mapping in Embodiment II.

Embodiment V

The embodiment of the present disclosure provides an electronic device, including a memory and a processor. The memory is configured to store a computer program, and the processor runs the computer program to enable the electronic device to implement the nonlinear oxygen-enriched injection method based on chaotic mapping in Embodiment III.

(1) The nonlinear oxygen-enriched injection method based on chaotic mapping and the electronic device according to the present disclosure can induce chaos in a molten pool, which promotes a reaction process, and greatly improves smelting efficiency.

(2) The nonlinear oxygen-enriched injection method based on chaotic mapping and the electronic device according to the present disclosure can set a peak rotational speed according to the demand.

(3) The nonlinear oxygen-enriched injection method based on chaotic mapping and the electronic device according to the present disclosure can set an oxygen enrichment amount according to the demand.

(4) The nonlinear oxygen-enriched injection method based on chaotic mapping and the electronic device according to the present disclosure can be used in the pyrometallurgical process, especially in the non-ferrous metal molten pool smelting process.

(5) The nonlinear oxygen-enriched injection method based on chaotic mapping and the electronic device according to the present disclosure can change a type of injection gas and be applied to the working medium mixing fields such as chemical industry.

The embodiments of the present specification are described in a progressive manner, each embodiment focuses on the difference from other embodiments, and the same and similar parts between the embodiments may refer to each other.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the content of the present specification shall not be construed as limitations to the present disclosure.

What is claimed is:

1. A nonlinear oxygen-enriched injection method based on chaotic mapping, comprising:

obtaining a chaotic mapping value corresponding to a current speed change period;

obtaining a chaotic gas injection volume corresponding to the current speed change period according to the chaotic mapping value corresponding to the current speed change period and a peak gas injection volume in an oxygen-enriched injection process, wherein speed change periods are determined by dividing the oxygen-enriched injection process at equal time intervals;

determining a rotational speed of a fan blade in a fan component corresponding to the current speed change period according to the chaotic gas injection volume corresponding to the current speed change period and a first relation, wherein the first relation is a relation between the chaotic gas injection volume and the rotational speed of the fan blade;

updating a rotational speed of a direct current (DC) motor in the fan component corresponding to the current speed change period according to the rotational speed of the fan blade in the fan component corresponding to the current speed change period, and driving the fan blade to rotate according to an updated rotational speed of the DC motor, so as to update an air output of the fan component; and determining whether the current speed change period is a last speed change period, and if not, calculating a chaotic mapping value corresponding to a next speed change period, updating the chaotic mapping value corresponding to the current speed change period to be the chaotic mapping value corresponding to the next speed change period, updating the current speed change period to be the next speed change period, and returning to the step of obtaining a chaotic gas injection volume corresponding to the current speed change period according to the chaotic mapping value corresponding to the current speed change period and a peak gas injection volume in an oxygen-enriched injection process.

2. The nonlinear oxygen-enriched injection method based on chaotic mapping according to claim 1, wherein the obtaining a chaotic mapping value corresponding to a current speed change period comprises:

calculating the chaotic mapping value corresponding to the current speed change period according to chaotic mapping of Logistic-Logistic (L-L) cascade and a chaotic mapping value corresponding to a previous speed change period.

3. The nonlinear oxygen-enriched injection method based on chaotic mapping according to claim 1, wherein the obtaining a chaotic gas injection volume corresponding to the current speed change period according to the chaotic mapping value corresponding to the current speed change period and a peak gas injection volume in an oxygen-enriched injection process comprises:

calculating the chaotic gas injection volume corresponding to the current speed change period according to $Q_i = Q_f x_i$, wherein $Q_i$ is the chaotic gas injection volume corresponding to the current speed change period, i is the current speed change period, $x_i$ is the chaotic mapping value corresponding to the current speed change period, and $Q_f$ is the peak gas injection volume in the oxygen-enriched injection process.

4. The nonlinear oxygen-enriched injection method based on chaotic mapping according to claim 1, wherein the determining a rotational speed of a fan blade in a fan component corresponding to the current speed change period according to the chaotic gas injection volume corresponding to the current speed change period and a first relation comprises:

calculating the rotational speed of the fan blade in the fan component corresponding to the current speed change period according to $n_i = \alpha Q_i$, wherein $n_i$ is the rotational speed of the fan blade in the fan component corresponding to the current speed change period, i is the current speed change period, $Q_i$ is the chaotic gas injection volume corresponding to the current speed change period, and $\alpha$ is determined by the air output of the fan component and the rotational speed of the fan blade in the fan component.

5. The nonlinear oxygen-enriched injection method based on chaotic mapping according to claim 1, wherein the updating a rotational speed of a DC motor in the fan component corresponding to the current speed change period according to the rotational speed of the fan blade in the fan component corresponding to the current speed change period comprises:

calculating a duty cycle of a power signal of the DC motor corresponding to the current speed change period according to the rotational speed of the fan blade in the fan component corresponding to the current speed change period;

calculating an average terminal voltage of an armature of the DC motor corresponding to the current speed change period according to the duty cycle of the power signal of the DC motor corresponding to the current speed change period; and updating the rotational speed of the DC motor in the fan component corresponding to the current speed change period according to the average terminal voltage of the armature of the DC motor corresponding to the current speed change period.

6. The nonlinear oxygen-enriched injection method based on chaotic mapping according to claim 5, wherein the rotational speed of the DC motor in the fan component corresponding to the current speed change period is a theoretical rotational speed of the DC motor, and the method further comprises:

obtaining an actual rotational speed of the DC motor in the current speed change period; and causing the actual rotational speed of the DC motor to be identical with the theoretical rotational speed of the DC motor by using a proportional-integral-derivative (PID) control algorithm.

7. The nonlinear oxygen-enriched injection method based on chaotic mapping according to claim 5, wherein the calculating a duty cycle of a power signal of the DC motor corresponding to the current speed change period according to the rotational speed of the fan blade in the fan component corresponding to the current speed change period comprises:

calculating the duty cycle of the power signal of the DC motor corresponding to the current speed change period according to $\gamma_i = \beta n_i + c$, wherein $n_i$ is the rotational speed of the fan blade in the fan component corresponding to the current speed change period, i is the current speed change period, $\gamma_i$ is the duty cycle of the power signal of the DC motor corresponding to the current speed change period, $\beta$ is a coefficient, and c is a constant.

8. A nonlinear oxygen-enriched injection method based on chaotic mapping, comprising:

determining a chaotic mapping value corresponding to each speed change period, wherein speed change periods are determined by dividing an oxygen-enriched injection process at equal time intervals, and the speed change periods are arranged in a chronological order;

obtaining a chaotic gas injection volume corresponding to each speed change period according to the chaotic mapping value and a peak gas injection volume in the oxygen-enriched injection process;

determining a rotational speed of a fan blade in a fan component corresponding to each speed change period according to the chaotic gas injection volume corresponding to each speed change period and a first relation, wherein the first relation is a relation between the chaotic gas injection volume and the rotational speed of the fan blade; and updating a rotational speed of a DC motor in the fan component corresponding to each speed change period according to the rotational speed of the fan blade in the fan component corresponding to each speed change period, and according to the arrangement order of the speed change periods, driving the fan blade to rotate according to an updated rotational speed of the DC motor, so as to update an air output of the fan component.

9. An electronic device, comprising a memory and a processor, wherein the memory is configured to store a computer program, and the processor executes the computer program to enable the electronic device to implement a nonlinear oxygen-enriched injection method based on chaotic mapping, the nonlinear oxygen-enriched injection method based on chaotic mapping comprising:

obtaining a chaotic mapping value corresponding to a current speed change period;

obtaining a chaotic gas injection volume corresponding to the current speed change period according to the chaotic mapping value corresponding to the current speed change period and a peak gas injection volume in an oxygen-enriched injection process, wherein speed change periods are determined by dividing the oxygen-enriched injection process at equal time intervals;

determining a rotational speed of a fan blade in a fan component corresponding to the current speed change period according to the chaotic gas injection volume corresponding to the current speed change period and a first relation, wherein the first relation is a relation between the chaotic gas injection volume and the rotational speed of the fan blade;

updating a rotational speed of a direct current (DC) motor in the fan component corresponding to the current speed change period according to the rotational speed of the fan blade in the fan component corresponding to the current speed change period, and driving the fan blade to rotate according to an updated rotational speed of the DC motor, so as to update an air output of the fan component; and determining whether the current speed change period is a last speed change period, and if not, calculating a chaotic mapping value corresponding to a next speed change period, updating the chaotic mapping value corresponding to the current speed change period to be the chaotic mapping value corresponding to the next speed change period, updating the current speed change period to be the next speed change period, and returning to the step of obtaining a chaotic gas injection volume corresponding to the current speed change period according to the chaotic mapping value corresponding to the current speed change period and a peak gas injection volume in an oxygen-enriched injection process.

10. The electronic device according to claim 9, wherein the obtaining a chaotic mapping value corresponding to a current speed change period comprises:
  calculating the chaotic mapping value corresponding to the current speed change period according to chaotic mapping of Logistic-Logistic (L-L) cascade and a chaotic mapping value corresponding to a previous speed change period.

11. The electronic device according to claim 9, wherein the obtaining a chaotic gas injection volume corresponding to the current speed change period according to the chaotic mapping value corresponding to the current speed change period and a peak gas injection volume in an oxygen-enriched injection process comprises:
  calculating the chaotic gas injection volume corresponding to the current speed change period according to $Q_i = Q_f x_i$,
  wherein $Q_i$ is the chaotic gas injection volume corresponding to the current speed change period, i is the current speed change period, $x_i$ is the chaotic mapping value corresponding to the current speed change period, and $Q_f$ is the peak gas injection volume in the oxygen-enriched injection process.

12. The electronic device according to claim 9, wherein the determining a rotational speed of a fan blade in a fan component corresponding to the current speed change period according to the chaotic gas injection volume corresponding to the current speed change period and a first relation comprises:
  calculating the rotational speed of the fan blade in the fan component corresponding to the current speed change period according to $n_i = \alpha Q_i$,
  wherein $n_i$ is the rotational speed of the fan blade in the fan component corresponding to the current speed change period, i is the current speed change period, $Q_i$ is the chaotic gas injection volume corresponding to the current speed change period, and $\alpha$ is determined by the air output of the fan component and the rotational speed of the fan blade in the fan component.

13. The electronic device according to claim 9, wherein the updating a rotational speed of a DC motor in the fan component corresponding to the current speed change period according to the rotational speed of the fan blade in the fan component corresponding to the current speed change period comprises:
  calculating a duty cycle of a power signal of the DC motor corresponding to the current speed change period according to the rotational speed of the fan blade in the fan component corresponding to the current speed change period;
  calculating an average terminal voltage of an armature of the DC motor corresponding to the current speed change period according to the duty cycle of the power signal of the DC motor corresponding to the current speed change period; and
  updating the rotational speed of the DC motor in the fan component corresponding to the current speed change period according to the average terminal voltage of the armature of the DC motor corresponding to the current speed change period.

14. The electronic device according to claim 13, wherein the rotational speed of the DC motor in the fan component corresponding to the current speed change period is a theoretical rotational speed of the DC motor, and the method further comprises:
  obtaining an actual rotational speed of the DC motor in the current speed change period; and
  causing the actual rotational speed of the DC motor to be identical with the theoretical rotational speed of the DC motor by using a proportional-integral-derivative (PID) control algorithm.

15. The electronic device according to claim 13, wherein the calculating a duty cycle of a power signal of the DC motor corresponding to the current speed change period according to the rotational speed of the fan blade in the fan component corresponding to the current speed change period comprises:
  calculating the duty cycle of the power signal of the DC motor corresponding to the current speed change period according to $\gamma_i = \beta n_i + c$,
  wherein $n_i$ is the rotational speed of the fan blade in the fan component corresponding to the current speed change period, i is the current speed change period, $\gamma_i$ is the duty cycle of the power signal of the DC motor corresponding to the current speed change period, $\beta$ is a coefficient, and c is a constant.

16. An electronic device, comprising a memory and a processor, wherein the memory is configured to store a computer program, and the processor executes the computer program to enable the electronic device to implement the nonlinear oxygen-enriched injection method based on chaotic mapping according to claim 8.

* * * * *